(12) United States Patent
Minematsu

(10) Patent No.: US 11,463,235 B2
(45) Date of Patent: Oct. 4, 2022

(54) ENCRYPTION DEVICE, ENCRYPTION METHOD, PROGRAM, DECRYPTION DEVICE, AND DECRYPTION METHOD

(71) Applicant: NEC Corporation, Tokyo (JP)

(72) Inventor: Kazuhiko Minematsu, Tokyo (JP)

(73) Assignee: Nec Corporation, Tokyo (JP)

( * ) Notice: Subject to any disclaimer, the term of this patent is extended or adjusted under 35 U.S.C. 154(b) by 228 days.

(21) Appl. No.: 16/970,742

(22) PCT Filed: Feb. 21, 2018

(86) PCT No.: PCT/JP2018/006293
§ 371 (c)(1),
(2) Date: Aug. 18, 2020

(87) PCT Pub. No.: WO2019/163032
PCT Pub. Date: Aug. 29, 2019

(65) Prior Publication Data
US 2021/0021406 A1   Jan. 21, 2021

(51) Int. Cl.
*H04L 29/06* (2006.01)
*H04L 9/06* (2006.01)
(Continued)

(52) U.S. Cl.
CPC ............ *H04L 9/0618* (2013.01); *G06F 21/64* (2013.01); *H04L 9/0662* (2013.01); *H04L 9/3242* (2013.01)

(58) Field of Classification Search
CPC ... H04L 9/0618; H04L 9/0662; H04L 9/3242; G06F 21/64
See application file for complete search history.

(56) References Cited

U.S. PATENT DOCUMENTS 8,321,675 B2   11/2012 Rogaway
2004/0017913 A1*  1/2004 Hawkes ............... H04L 9/0643
380/37
(Continued)

FOREIGN PATENT DOCUMENTS

| JP | 2007-534230 A | 11/2007 |
| JP | 2016-075765 A | 5/2016 |
| WO | 2015/015702 A1 | 2/2015 |

OTHER PUBLICATIONS

Japanese Office Action for JP Application No. 2020-501908 dated Sep. 7, 2021 with English Translation.

(Continued)

*Primary Examiner* — Shawnchoy Rahman
(74) *Attorney, Agent, or Firm* — Sughrue Mion, PLLC

(57) ABSTRACT

An encryption device includes an encryption unit that encrypts blocks, obtained by dividing a plaintext, with use of an auxiliary variable, a partial checksum generation unit that generates a plurality of partial checksums on the basis of the blocks obtained by dividing the plaintext, a meta checksum generation unit that generates a meta checksum on the basis of the partial checksums generated by the partial checksum generation unit, and a tag generation unit that generates a tag to be used for detecting tampering, on the basis of the meta checksum generated by the meta checksum generation unit. The encryption device outputs a ciphertext encrypted by the encryption unit and the tag generated by the tag generation unit.

10 Claims, 14 Drawing Sheets

(51) Int. Cl.
*G06F 21/64* (2013.01)
*H04L 9/32* (2006.01)

(56) References Cited

U.S. PATENT DOCUMENTS

| | | | |
|---|---|---|---|
| 2004/0019783 A1* | 1/2004 | Hawkes | H04L 9/0637 380/37 |
| 2005/0180563 A1 | 8/2005 | Apostolopoulos et al. | |
| 2008/0172562 A1 | 7/2008 | Cachin et al. | |
| 2010/0031054 A1* | 2/2010 | Starr | G06F 21/6218 711/111 |
| 2013/0077780 A1 | 3/2013 | Rogaway | |
| 2014/0146964 A1 | 5/2014 | Yamada et al. | |
| 2016/0173276 A1 | 6/2016 | Minematsu | |

OTHER PUBLICATIONS

Abed, F., Forler, C. and Lucks, S., "General classification of the authenticated encryption schemes for the CAESER competition",Cryptology ePrint Archve, Report 2014/792, Oct. 13, 2016, pp. 1-28, <URL:https://eprint.iacr.org/2014/792>.

International Search Report for PCT Application No. PCT/JP2018/006293, dated May 22, 2018.

Efficient Instantiations of Tweakable Blockciphers and Refinements to Modes OCB and PMAC. Phillip Rogaway. ASIACRYPT Sep. 24, 2004, USA http://web.cs.ucdavis.edu/~rogaway/papers/oifsets.pdf.

How to Securely Release Unverified Plaintext In Authenticated Encryption. Elena Andreeva, Andrey Bogdanov, Atul Luykx, Bart Mennink, Nicky Mouha, and Kan Yasuda. Asiacrypt 2014. https://eprint.iacr.org/2014/144.pdf.

NIST Special Publication 800-38B. Recommendation for Block Cipher Modes of Operation: The CMAC Mode for Authentication, Morris Dworkin, USA, May 2005 http://csrc.nist.gov/publications/nistpubs/800-38B/SP_800-38B.pdf.

Abed, F., Forler, C. and Lucks, S., General classification of the authenticated encryption schemes for the CAESER competition, Computer Science Review, 2016, No. 22, p. 13-26, especially 3.2 Functional characteristics, 4.3 Robustness, Germany.

* cited by examiner 2-round Feistel
TE(N,i,2)
TE(N,i,1)

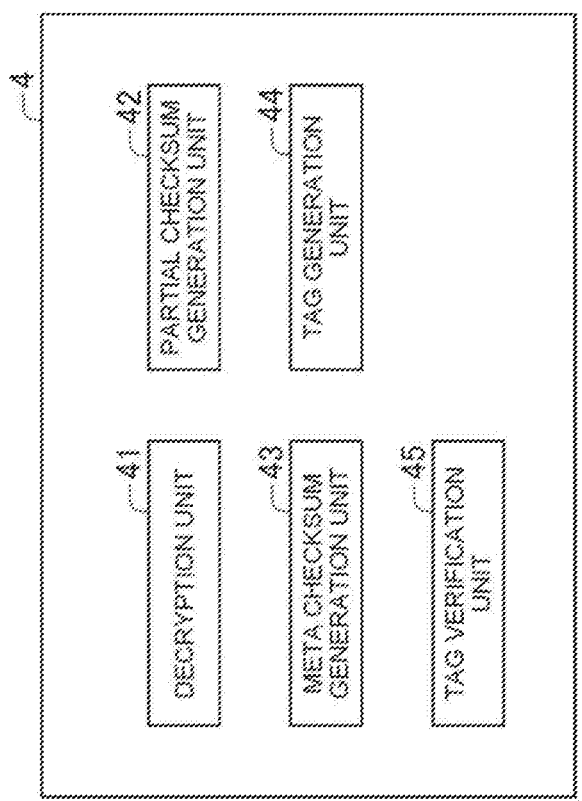

ENCRYPTION DEVICE, ENCRYPTION METHOD, PROGRAM, DECRYPTION DEVICE, AND DECRYPTION METHOD

This application is a National Stage Entry of PCT/JP2018/006293 filed on Feb. 21, 2018, the contents of all of which are incorporated herein by reference, in their entirety.

TECHNICAL FIELD

The present invention relates to an encryption device, an encryption method, a program, a decryption device, and a decryption method.

BACKGROUND ART

Art called authenticated encryption (AE) has been known. In the authenticated encryption, encryption and authentication tag calculation for detecting tampering are simultaneously applied to a plaintext message with use of a secret key shared in advance.

As a technique of efficiently performing such authenticated encryption, an authenticated encryption system called an offset code book (OCB) mode, as shown in Patent Literature 1, has been known. The OCB mode is an extension of a block cipher called a Tweakable block cipher in which an auxiliary variable (adjustment value) called Tweak is introduced for encryption and decryption. Specifically, in the OCB mode, encryption using Tweak is performed through encryption by the XEX mode described in Non-Patent Literature 1. Moreover, in the OCB mode, a tag is generated by performing a process similar to the process for performing the encryption on exclusive-OR of each block generated by dividing a plaintext.

As an example of an authenticated encryption system, Patent Literature 2 has been known, for example. Patent Literature 2 discloses an encryption device having a two-round Feistel encryption means. The two-round Feistel encryption means divides a plaintext per two n-bit blocks, and performs encryption by means of two-round Feistel replacement. The two-round Feistel encryption means uses an encryption function in which an auxiliary variable called Tweak is incorporated in a round function having a two-round Feistel structure. Note that the art disclosed in Patent Literature 2 is also referred to as an offset two-round (OTR) system.

As a modification of the OTR system disclosed in Patent Literature 2, Patent Literature 3 has been known, for example. Patent Literature 3 discloses an authenticated encryption device including a block nonce generating means that generates a block nonce having a different value for each data block, and an encryption data generating means for generating encryption data by encrypting a corresponding block nonce with a common key and calculating exclusive-OR with a data block. In the case of the art disclosed in Patent Literature 3, the process described above is performed instead of two-round Feistel replacement.

Further, as related art, Patent Literature 4 has also been known. Patent Literature 4 discloses a method of calculating an encryption checksum for each segment and combining the segment and the encryption checksum, thereby generating a media segment.

Patent Literature 1: U.S. Pat. No. 8,321,675 B
Patent Literature 2: WO 2015/015702 A
Patent Literature 3: JP 2016-75765 A
Patent Literature 4: JP 2007-534230 A Non-Patent Literature 1: Efficient Instantiations of Tweakable Blockciphers and Refinements to Modes OCB and PMAC. Phillip Rogaway. ASIACRYPT 2004. http://web.cs.ucdavis.edu/~rogaway/papers/offsets.pdf Non-Patent Literature 2: How to Securely Release Unverified Plaintext in Authenticated Encryption. Elena Andreeva, Andrey Bogdanov, Atul Luykx, Bart Mennink, Nicky Mouha, and Kan Yasuda. Asiacrypt 2014. https://eprint.iacr.org/2014/144.pdf Non-Patent Literature 3: NIST Special Publication 800-38B. Recommendation for Block Cipher Modes of Operation: The CMAC Mode for Authentication http://csrc.nist.gov/publications/nistpubs/800-38B/SP_800-38B.pdf

SUMMARY

As a problem that is often considered in authenticated encryption, misuse in encryption and decryption has been known. This means an attack that is caused by not complying with rules originally required for safe encryption and decryption, and is considered as a real problem.

As a misuse of authenticated encryption, leakage of an unverified plaintext in decryption has been known. Originally, in decryption of authenticated encryption, when tampering is found, it is not necessary to output a plaintext being decrypted, that is, an unverified plaintext. However, there is a case where an unverified plaintext is output due to constraints of the memory on the decryption side or an implementation error of the encryption program. In such a case, when an attacker performs tampering, information of binary information or more indicating whether or not the verification is accepted is given to the attacker. Therefore, an attack may be allowed depending on the authenticated encryption system. Such a problem is also referred to as decryption-misuse.

As a method of evaluating difficulty in tampering when there is a leakage of an unverified plaintext, integrity-under-release-of-unverified-plaintext (INT-RUP) security, described in Non-Patent Document 2, has been known. Non-Patent Literature 2 discloses that OCB as described in Patent Document 1 is not INT-RUP secure. Specifically, Non-Patent Literature 2 discloses that regarding OCB using n-bit block cipher (for example, in the case of AES, n=128), forgery can be made by querying an n-block ciphertext to unverified decryption oracle several times. Note that the unverified decryption oracle corresponds to one in which the role of a decryption device (decoder) is divided.

The OTR system described in Patent Literature 2 also has the same structure as that of the OCB. Therefore, the OTR system is not INT-RUP secure as in the case of OCB.

As described above, OCB and OTR that are efficient authenticated encryption systems do not have INT-RUP security. This fact is a factor of hindering use of OCB or OTR in a scenario involving leakage of an unverified plaintext, that is, the case where the memory on the decryption side is very small, for example.

As described above, the art described in Patent Literature 3 is a modification of OTR, and in Patent Literature 4, the problem described above is not considered at all. Therefore, the problem described above has not been solved by using the art of Patent Literatures 3 and 4.

In view of the above, an object of the present invention is to provide an encryption device, an encryption method, a program, a decryption device, and a decryption method that are capable of solving the problem that efficient authenticated encryption systems may not be safe if there is a possibility of leakage of an unverified plaintext.

In order to achieve such an object, an encryption device according to one aspect of the present invention includes an encryption unit that encrypts blocks, obtained by dividing a plaintext, with use of an auxiliary variable, a partial checksum generation unit that generates a plurality of partial checksums on the basis of the blocks obtained by dividing the plaintext, a meta checksum generation unit that generates a meta checksum on the basis of the partial checksums generated by the partial checksum generation unit, and a tag generation unit that generates a tag to be used for detecting tampering, on the basis of the meta checksum generated by the meta checksum generation unit.

The encryption device is configured to output a ciphertext encrypted by the encryption unit and the tag generated by the tag generation unit.

An encryption method according to another aspect of the present invention is an encryption method performed by an encryption device. The method includes encrypting blocks, obtained by dividing a plaintext, with use of an auxiliary variable, generating a plurality of partial checksums on the basis of the blocks obtained by dividing the plaintext, generating a meta checksum on the basis of the partial checksums generated, generating a tag to be used for detecting tampering, on the basis of the meta checksum generated, and outputting a ciphertext obtained by encrypting the plaintext, and the tag.

A program according to another aspect of the present invention is a program for causing an encryption device to realize an encryption unit that encrypts blocks, obtained by dividing a plaintext, with use of an auxiliary variable, a partial checksum generation unit that generates a plurality of partial checksums on the basis of the blocks obtained by dividing the plaintext, a meta checksum generation unit that generates a meta checksum on the basis of the partial checksums generated by the partial checksum generation unit, and a tag generation unit that generates a tag to be used for detecting tampering, on the basis of the meta checksum generated by the meta checksum generation unit, and to output a ciphertext encrypted by the encryption unit and the tag generated by the tag generation unit.

A decryption device according to another aspect of the present invention includes a decryption unit that decrypts each of blocks, obtained by dividing a ciphertext, with use of an auxiliary variable and generates a plaintext, a partial checksum generation unit that generates a plurality of partial checksums on the basis of the blocks of the plaintext decrypted by the decryption unit, a meta checksum generation unit that generates a meta checksum on the basis of the partial checksums generated by the partial checksum generation unit, a tag generation unit that generates a verification tag to be used for detecting tampering, on the basis of the meta checksum generated by the meta checksum generation unit, and a tag verification unit that performs verification by comparison between a tag received along with the ciphertext and the verification tag generated by the tag generation unit.

The decryption device is configured to output the plaintext decrypted by the decryption unit, and a result of verification by the comparison by the tag verification unit.

A decryption method according to another aspect of the present invention is a decryption method performed by a decryption device. The method includes decrypting each of blocks, obtained by dividing a ciphertext, with use of an auxiliary variable and generating a plaintext, generating a plurality of partial checksums on the basis of the blocks of the plaintext decrypted, generating a meta checksum on the basis of the partial checksums generated, generating a verification tag to be used for detecting tampering, on the basis of the meta checksum generated, performing verification by comparison between a tag received along with the ciphertext and the verification tag generated, and outputting the decrypted plaintext and a result of verification by the comparison.

A program according to another aspect of the present invention is a program for causing a decryption device to realize a decryption unit that decrypts each of blocks, obtained by dividing a ciphertext, with use of an auxiliary variable and generates a plaintext, a partial checksum generation unit that generates a plurality of partial checksums on the basis of the blocks of the plaintext decrypted by the decryption unit, a meta checksum generation unit that generates a meta checksum on the basis of the partial checksums generated by the partial checksum generation unit, a tag generation unit that generates a verification tag to be used for detecting tampering, on the basis of the meta checksum generated by the meta checksum generation unit, and a tag verification unit that performs verification by comparison between a tag received along with the ciphertext and the verification tag generated by the tag generation unit, and to output the plaintext decrypted by the decryption unit, and a result of verification by the comparison by the tag verification unit.

With the configurations described above, the present invention is able to provide an encryption device, an encryption method, a program, a decryption device, and a decryption method that can solve a problem that efficient authenticated encryption systems may not be safe if there is a possibility of leakage of an unverified plaintext.

BRIEF DESCRIPTION OF DRAWINGS

FIG. 14 is a block diagram illustrating an exemplary configuration of a decryption device according to the second exemplary embodiment of the present invention.

EXEMPLARY EMBODIMENTS

First Exemplary Embodiment

Figure 1:
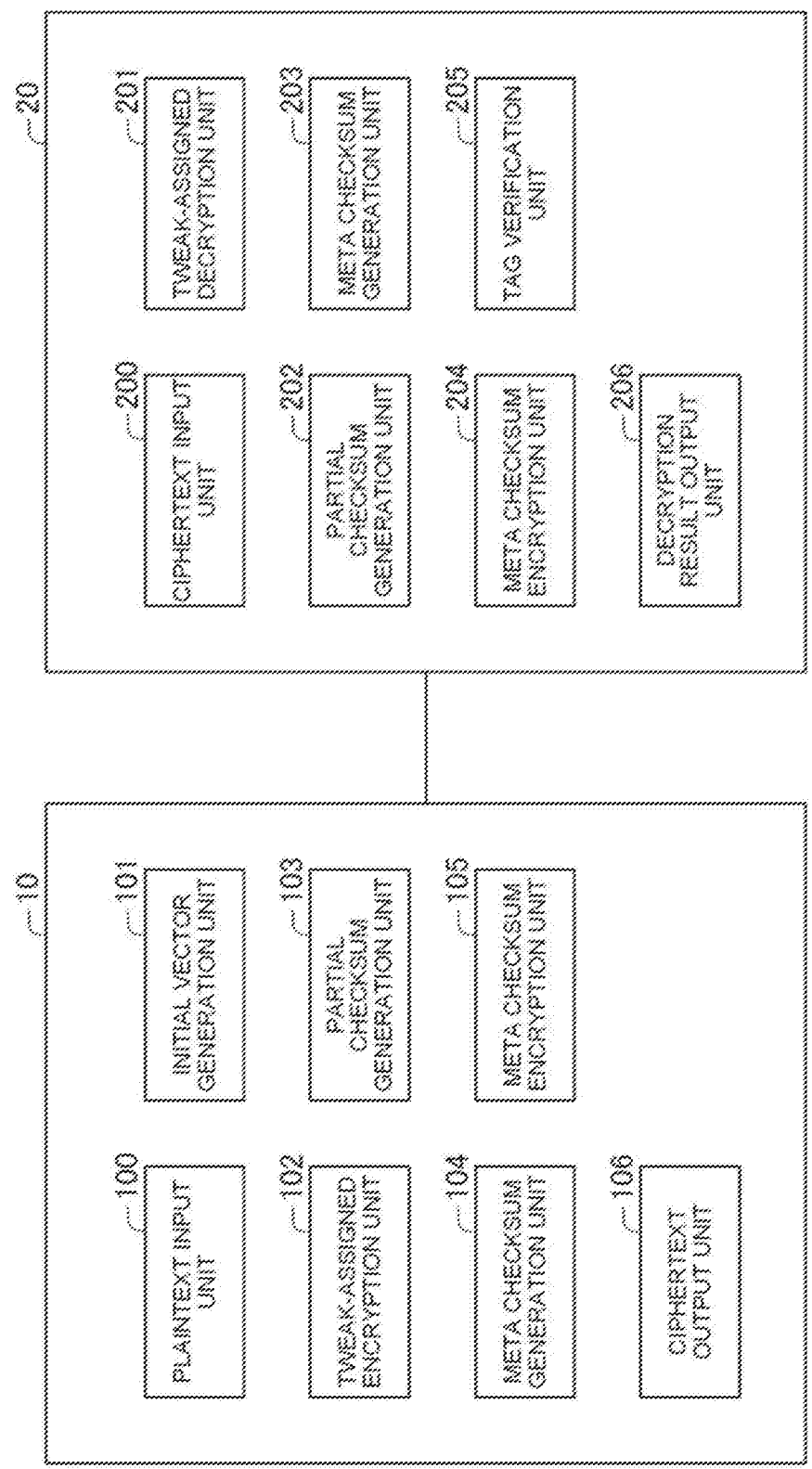
FIG. 1 is a block diagram illustrating an example of an overall configuration of an authenticated encryption system according to a first exemplary embodiment of the present invention.
Figure 2:
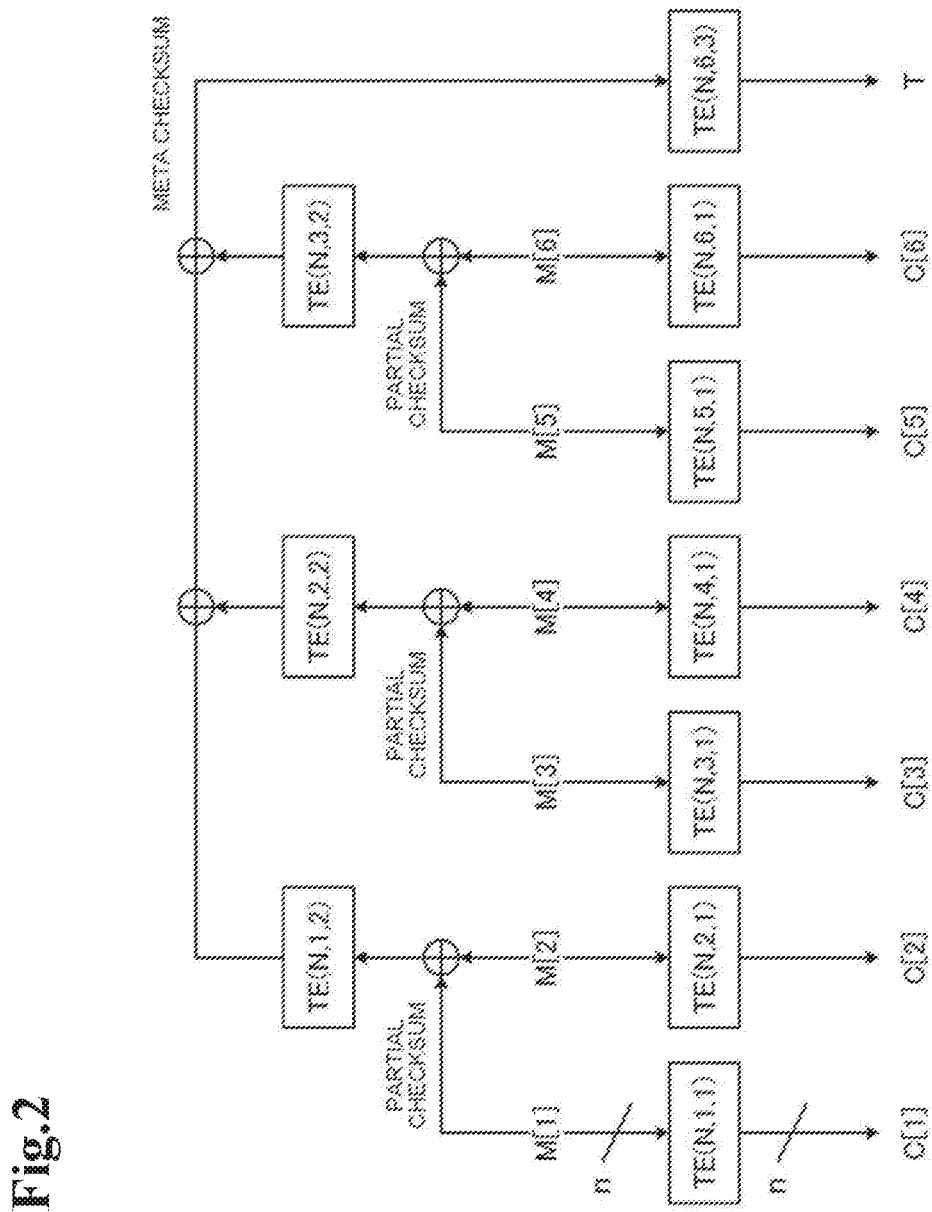
FIG. 2 illustrates an example of processing when an encryption device realizes an encryption routine by XEX mode.
Figure 3:
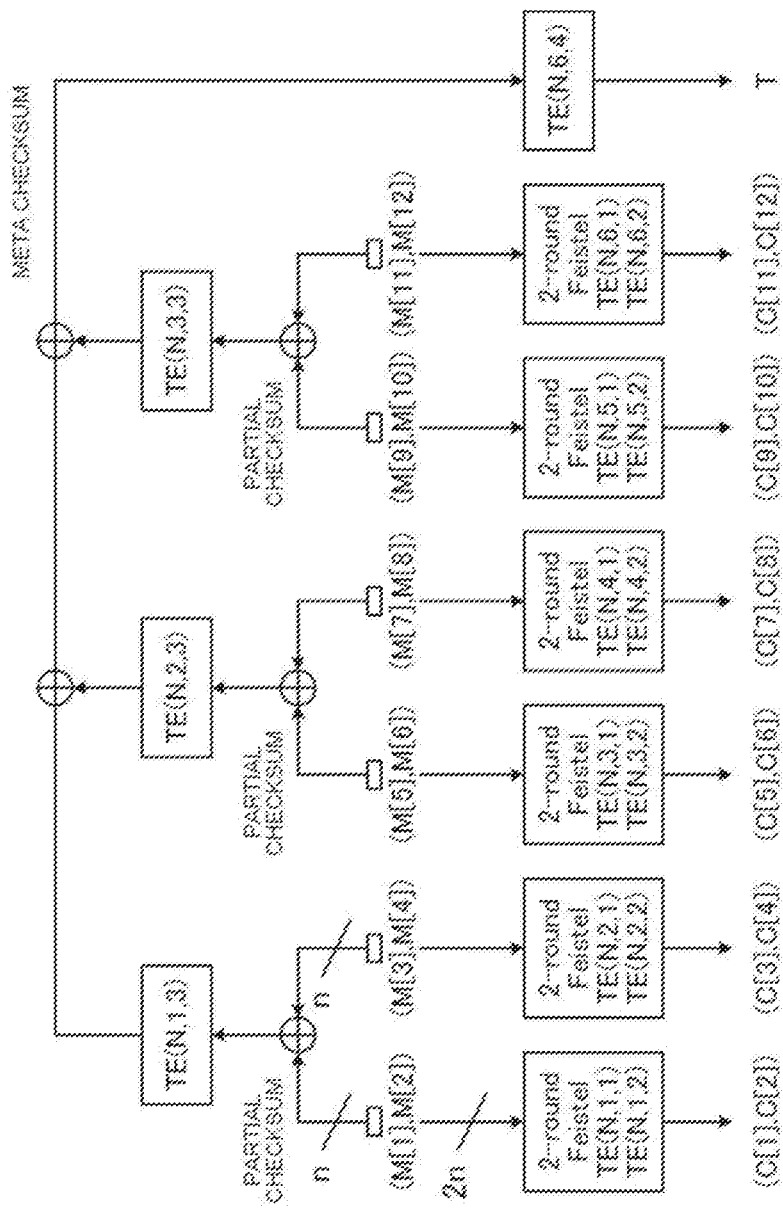
FIG. 3 illustrates an example of processing when an encryption device realizes an encryption routine by two-round Feistel replacement.
Figure 4:
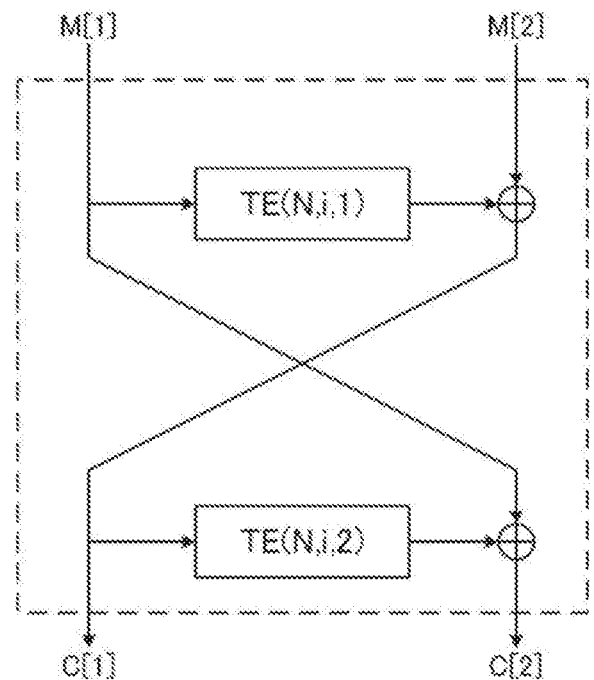
FIG. 4 illustrates an example of an internal structure of two-round Feistel replacement.
Figure 5:
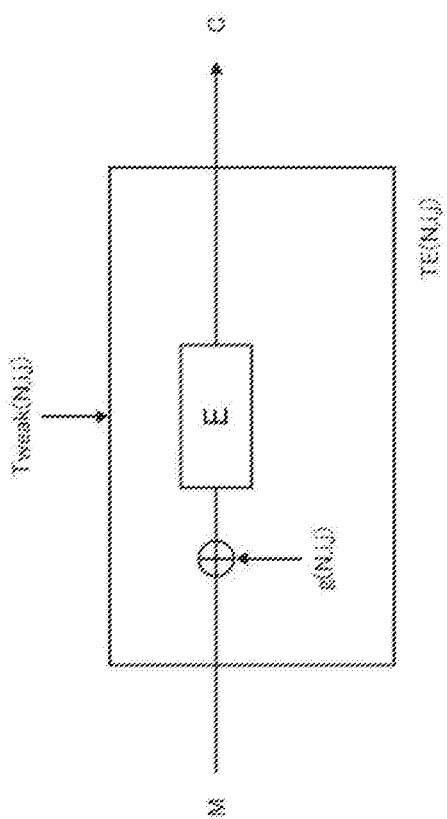
FIG. 5 illustrates an example of an internal structure of two-round Feistel replacement.
Figure 6:
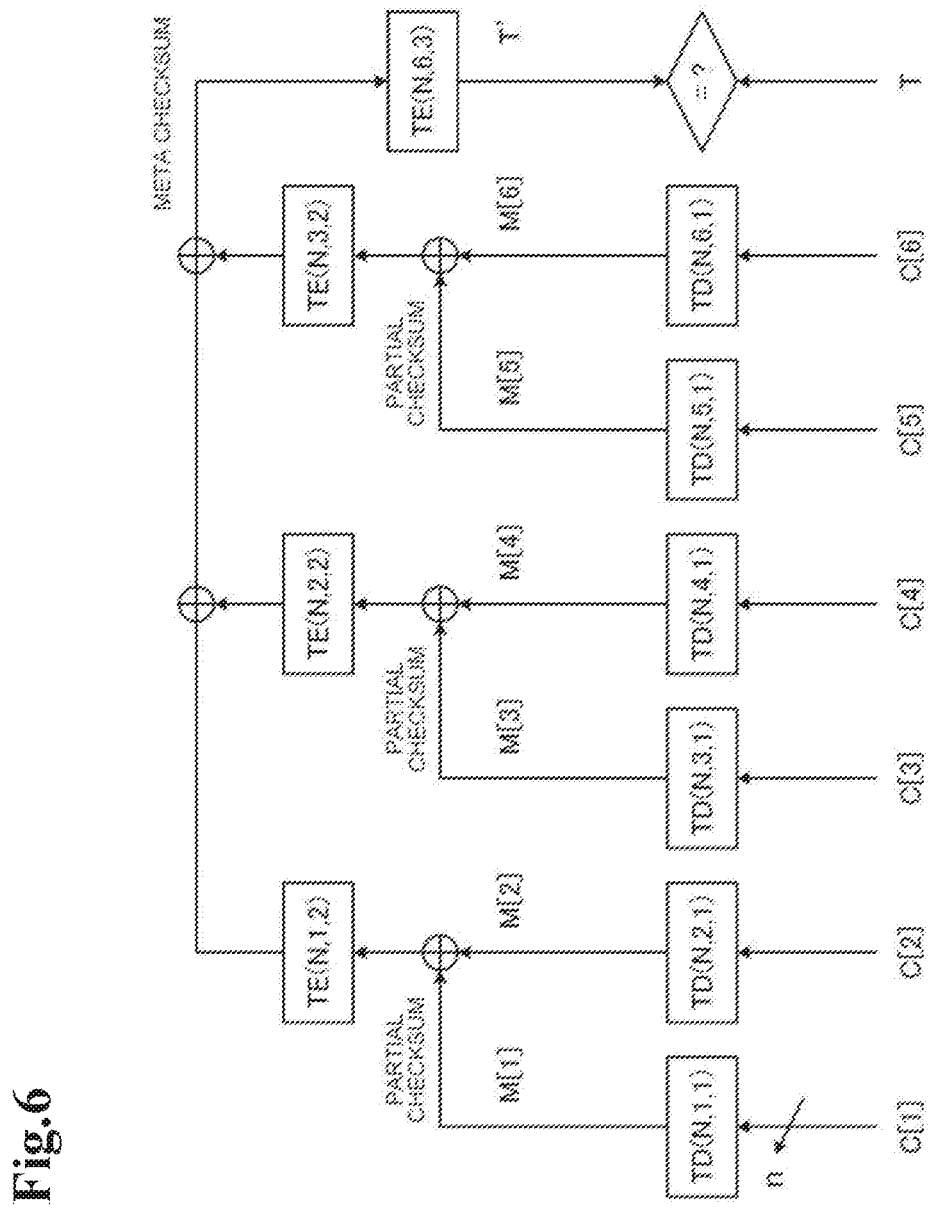
FIG. 6 illustrates an example of processing when a decryption device realizes a decryption routine by XEX mode.
Figure 7:
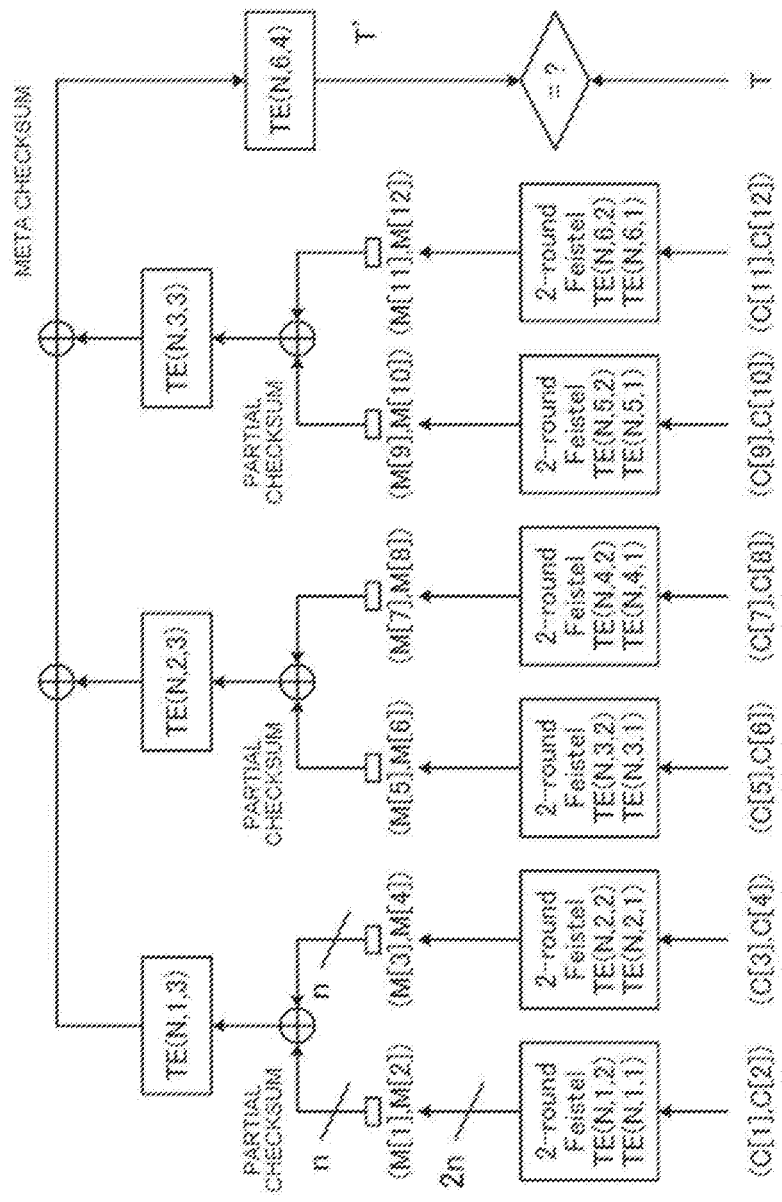
FIG. 7 illustrates an example of processing when a decryption device realizes a decryption routine by two-round Feistel replacement.
Figure 8:
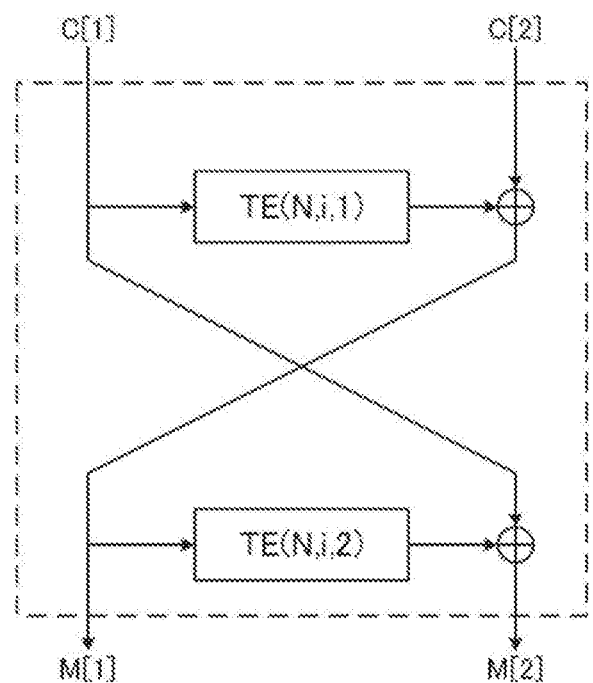
FIG. 8 illustrates an example of an internal structure of two-round Feistel replacement.
Figure 9:
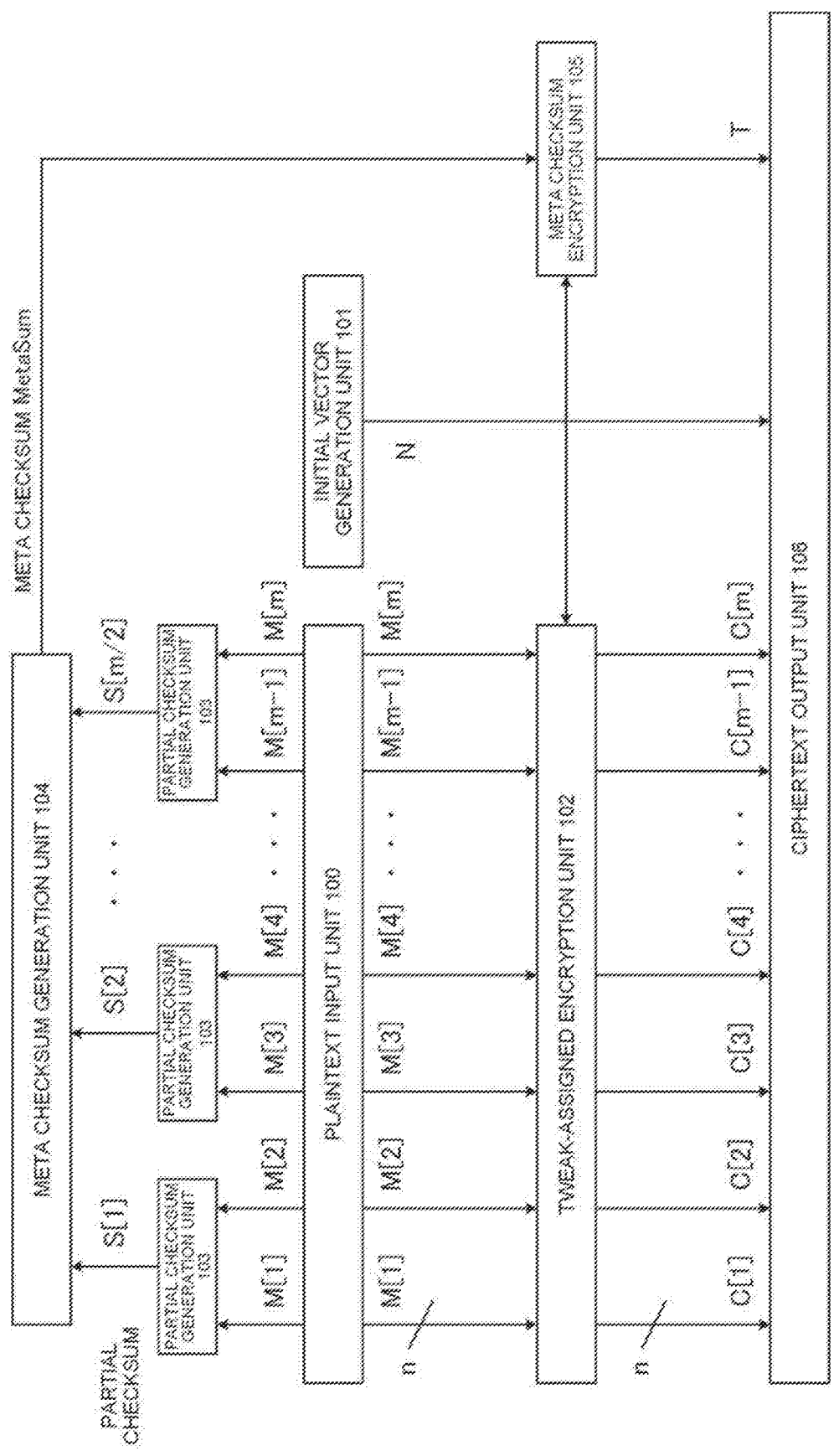
FIG. 9 illustrates an example of processing performed by an encryption device.
Figure 10:
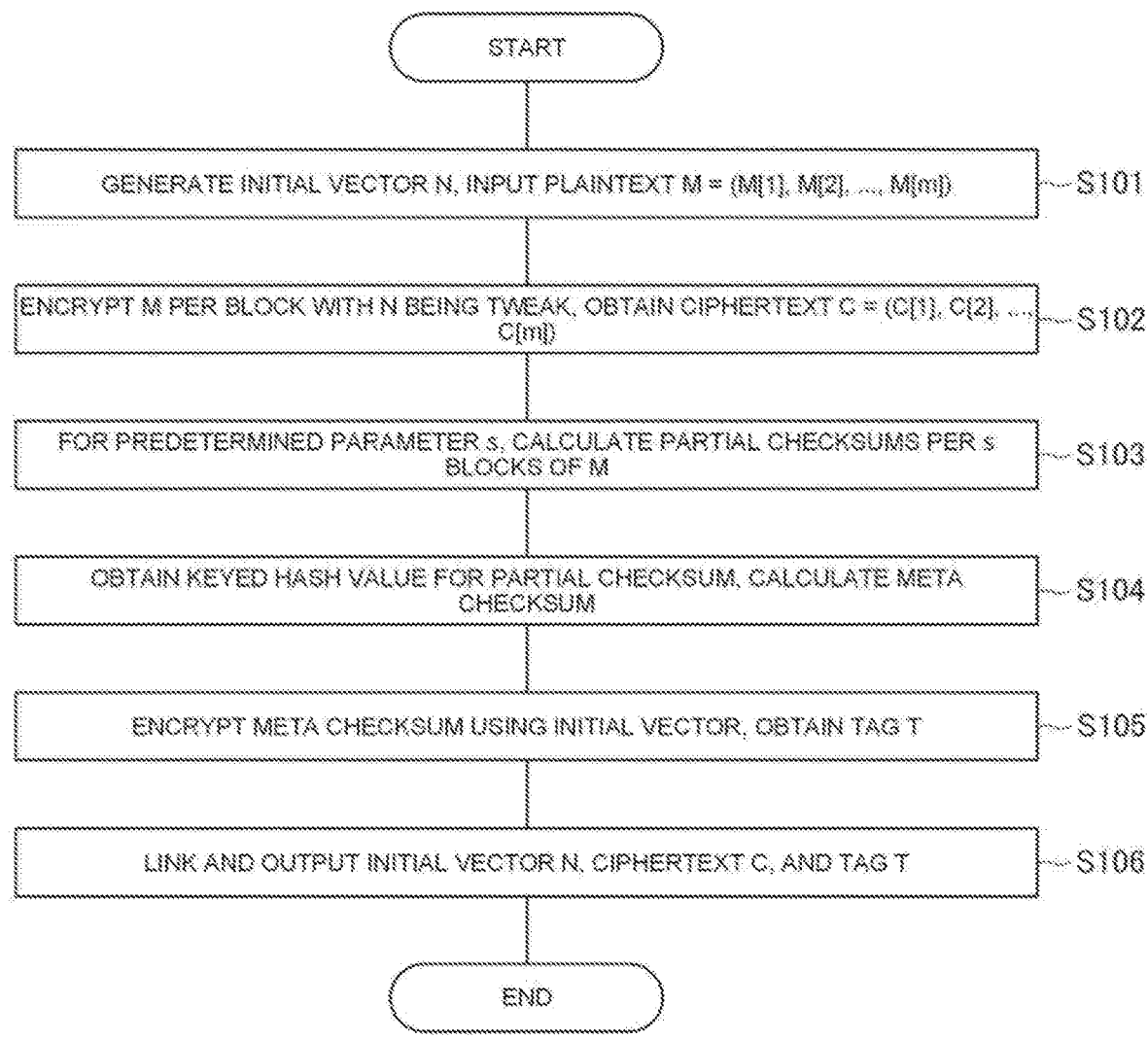
FIG. 10 is a flowchart illustrating an exemplary flow of processing performed by an encryption device.
Figure 11:
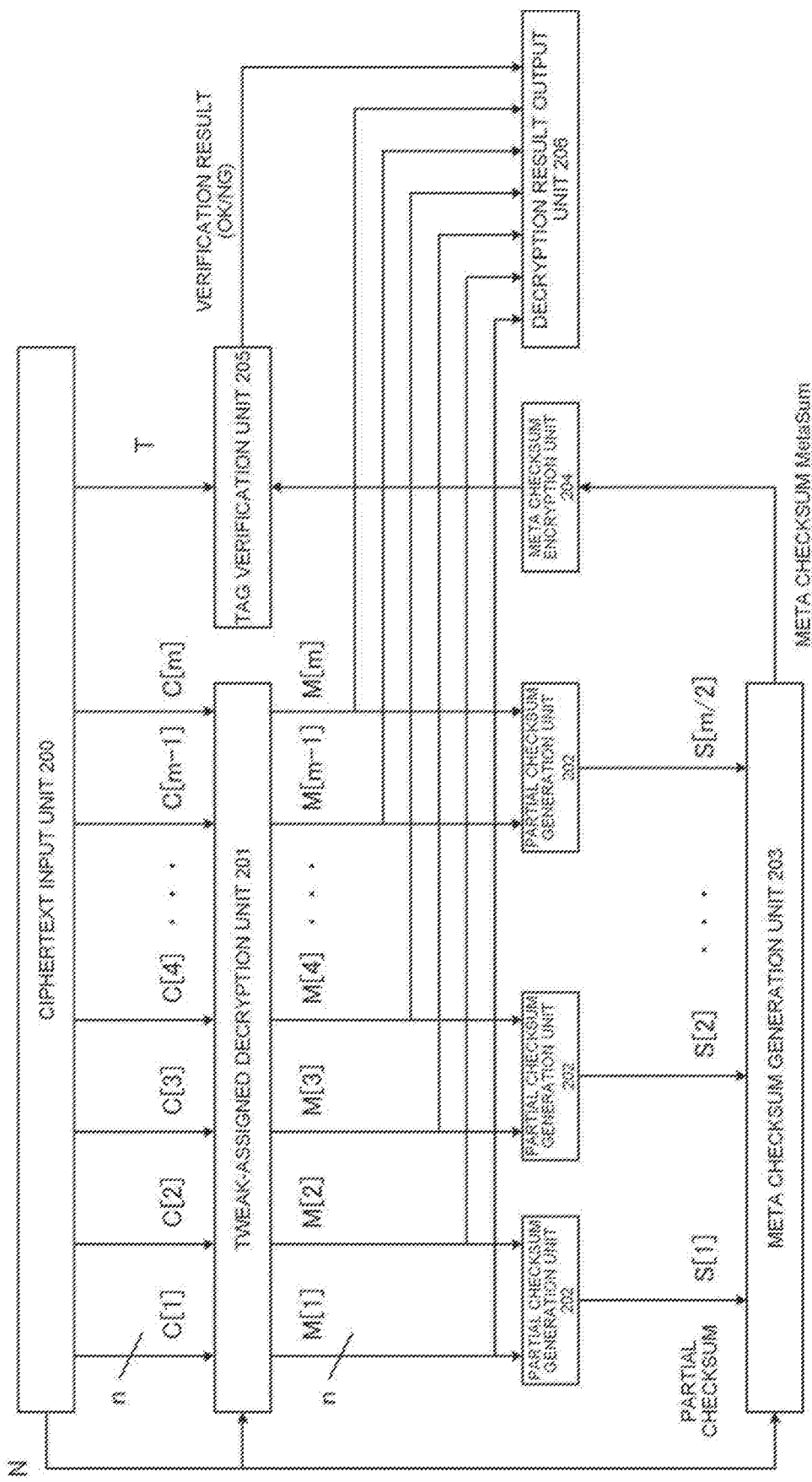
FIG. 11 illustrates an example of processing performed by a decryption device.
Figure 12:
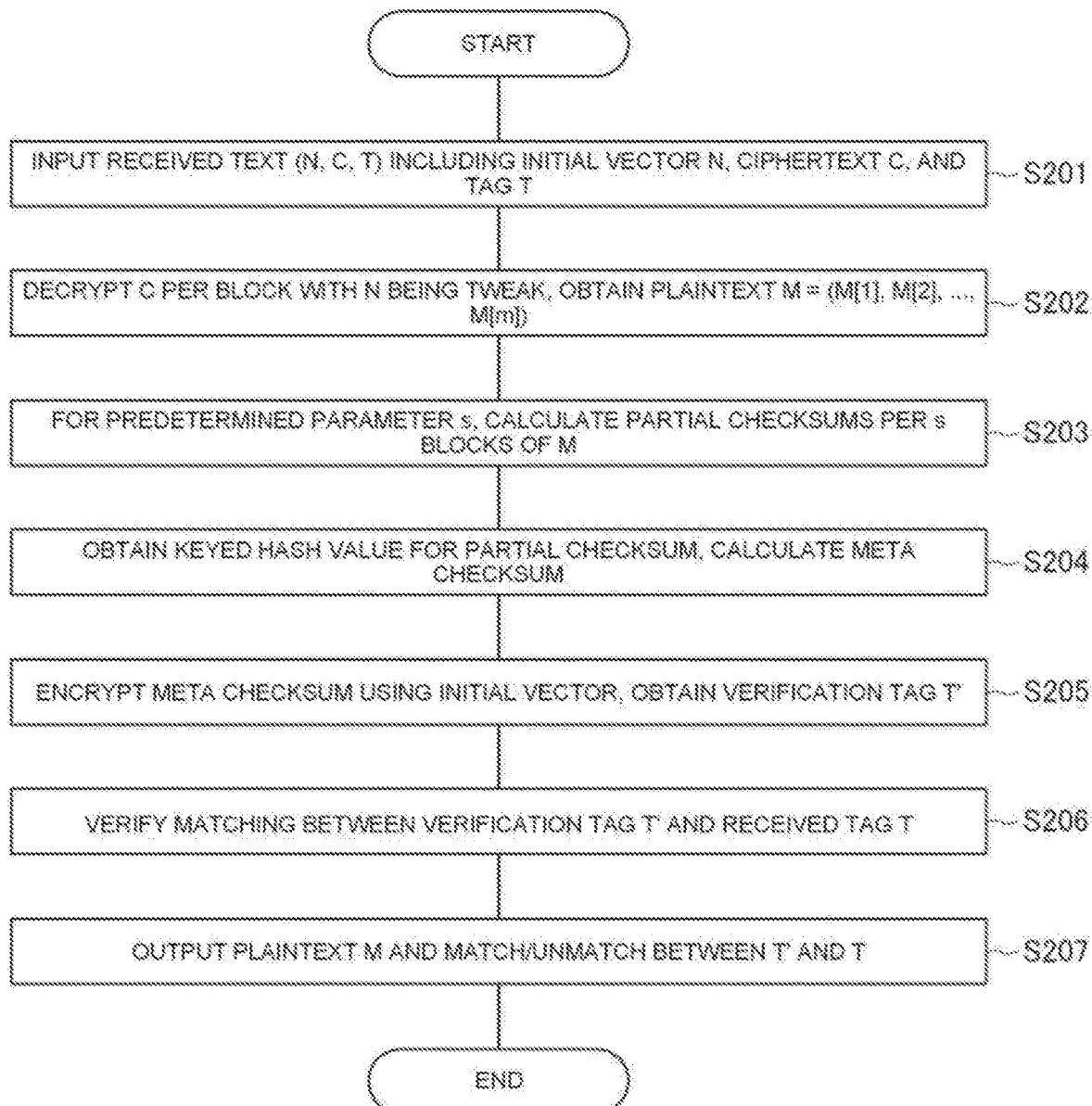
FIG. 12 is a flowchart illustrating an exemplary flow of processing performed by a decryption device.

A first exemplary embodiment of the present invention will be described with reference to FIGS. 1 to 12. FIG. 1 is a block diagram illustrating an example of the overall configuration of an authenticated encryption system. FIG. 2 illustrates an example of processing when an encryption device 10 realizes an encryption routine by XEX mode. FIG. 3 illustrates an example of processing when the encryption device 10 realizes an encryption routine by two-round Feistel replacement. FIGS. 4 and 5 illustrate examples of the internal structure of the two-round Feistel replacement. FIG. 6 illustrates an example of processing when a decryption device 20 realizes a decryption routine by XEX mode. FIG. 7 illustrates an example of processing when the decryption device 20 realizes a decryption routine by the two-round Feistel replacement. FIG. 8 illustrates an example of the internal structure of two-round Feistel replacement. FIG. 9 illustrates an example of processing performed by the encryption device 10. FIG. 10 is a flowchart illustrating an exemplary flow of processing performed by the encryption device 10. FIG. 11 illustrates an example of processing performed by a decryption device 20. FIG. 12 is a flowchart illustrating an exemplary flow of processing performed by the decryption device 20.

In the first exemplary embodiment, an encryption system including an encryption device 10 will be described. The encryption device 10 divides a plaintext into blocks having a predetermined size and performs encryption for each one or two blocks, in an encryption system using a common secret key. The encryption device 10 of the present embodiment uses an auxiliary variable called Tweak for encryption. Further, as described below, the encryption device 10 gathers a number of blocks corresponding to a predetermined parameter "s" into one, and calculates a plurality of partial checksums for the blocks gathered. Then, the encryption device 10 calculates a meta checksum based on the partial checksums, and encrypts the meta checksum to thereby generate a tag. In this way, by calculating a meta checksum based on the partial checksums to generate a tag, it is possible to secure INT-RUP security.

The authenticated encryption system is a system that is applicable to usages such as encryption and message authentication in wireless or wired data communication, and protection of communication between a wireless sensor device and an information collection server (may also be applicable to usages other than those mentioned above as examples). FIG. 1 illustrates an exemplary configuration of an authenticated encryption system. Referring to FIG. 1, the authenticated encryption system includes the encryption device 10 and the decryption device 20. Note that the encryption device 10 and the decryption device 20 may be configured of a plurality of information processing devices that are communicably connected with each other, or may be configured of one information processing device.

The encryption device 10 performs encryption on a plaintext M with use of a common secret key shared with the decryption device 20, and generates a tag T that is an authentication tag to be used for detecting tampering. Referring to FIG. 1, the encryption device 10 includes, for example, a plaintext input unit 100, an initial vector generation unit 101, a Tweak-assigned encryption unit 102 (encryption unit), a partial checksum generation unit 103, a meta checksum generation unit 104, a meta checksum encryption unit 105 (tag generation unit), and a ciphertext output unit 106.

For example, the encryption device 10 includes an arithmetic unit such as a central processing unit (CPU) and a storage unit, not shown. The encryption device 10 implements the respective processing units through execution of a program, stored in the storage unit not shown, by the arithmetic unit, for example. Note that processing accompanying encryption performed by the respective processing units may be realized by an encoder included in the encryption device 10.

The plaintext input unit 100 receives the plaintext M to be encrypted. The plaintext input unit 100 is realized by a character input unit such as a keyboard, for example. The plaintext input unit 100 may receive an input of the plaintext M from an external device connected via a network, for example.

The initial vector generation unit 101 generates an initial vector N that is different from a value generated in the past. The initial vector generation unit 101 first outputs an arbitrary fixed value, for example. Also, the initial vector generation unit 101 stores the value of an initial vector generated most recently. Then, when generating an initial vector N second time or later, the initial vector generation unit 101 outputs a value obtained by adding 1 to the most recent value stored. As described above, the initial vector generation unit 101 generates the initial vector N that is different from the value generated in the past, by outputting a value obtained by adding 1 to the value that was output last time. Note that the initial vector generation unit 101 may generate an initial vector by a method other than that described above as an example, if a value different from the value generated in the past can be generated.

The Tweak-assigned encryption unit 102 acquires "m" pieces of blocks M[1], M[2], . . . M[m] generated by dividing the plaintext M per n-bits blocks. Then, the Tweak-assigned encryption unit 102 encrypts each block M[i] (i=1, 2, . . . , m) with a common key by using the initial vector N and an index i of the block as an auxiliary variable called Tweak. Thereby, the Tweak-assigned encryption unit 102 acquires a ciphertext C=(C[1], C[2], . . . , C[m]) having a length that is the same as the length of the block obtained by dividing the plaintext M. Note that the Tweak may include an index j (for example, j=1) representing the type of processing.

For example, the Tweak-assigned encryption unit 102 can perform encryption by the XEX mode shown in Non-Patent Document 1. FIG. 2 illustrates an example of processing of the entire encryption device 10 when the Tweak-assigned encryption unit 102 of the encryption device 10 performs encryption by the EXE mode. Referring to FIG. 2, when performing encryption by the XEX mode, the Tweak-assigned encryption unit 102 uses extension of a block cipher called a Tweakable block cipher as follows:

$$C[i]=TE(N,i,j)(M[i])$$

where $TE(N,i,j)=g(N,i,j)+E(g(N,i,j)+M[i])$ (Expression XEX)

Here, + represents exclusive-OR for each bit, E(*) represents an encryption function by block cipher E (secret key is assumed to be included). Further, g(*, *, *) represents an n-bit mask generation function. Typically, it is generated from $g(N, i, j)=E(N).2^i.3^j$, where 2 and 3 represent generator (x in polynomial representation) and generator+neutral element (x+1 in polynomial representation) of a finite field $GF(2^n)$, X. Y represents multiplication of elements X and Y on the finite field $GF(2^n)$, and $2^i$ and $3^j$ represent the $i^{th}$ power of 2 and the $j^{th}$ power of 3, respectively.

As described above, the Tweak-assigned encryption unit 102 performs encryption on each block, on the basis of the TE function and the blocks obtained by dividing the plaintext M. For example, in the case illustrated in FIG. 2, the Tweak-assigned encryption unit 102 performs encryption based on the block M[1] of the plaintext and a TE function TE(N, 1, 1), to thereby obtain a block C[1] of a ciphertext. Note that FIG. 2 illustrates the case where m=6 pieces of blocks are obtained from the plaintext M, for example. However, the number of blocks obtained through division by the Tweak-assigned encryption unit 102 is not limited to six. That is, "m" may take any number.

Also, as illustrated in FIGS. 3 to 5, the Tweak-assigned encryption unit 102 can be configured to divide a plaintext per two n-bit blocks and then perform encryption by the two-round Feistel replacement disclosed in Patent Literature 2. As illustrated in FIG. 4, encryption by the two-round Feistel replacement is performed as follows on continuous two blocks M[i] and M[i+1] (where i represents odd number) of the plaintext:

$$C[i]=TE(N,(i+1)/2,j)(M[i])+M[i+1]$$

$$C[i+1]=TE(N,(i+1)/2,j')(C[i])+M[i]$$ (Expression 2RFesitel)

Note that j and j' may take any value if they are different. Moreover, instead of (i+1)/2, a function f(i) regarding any odd number i, in which f(i) and f(i+2) differ from each other, may be used.

Furthermore, in the case of performing encryption by the two-round Feistel replacement, as the TE function, it is possible to use XE mode $TE(N, i, j)=E(g(N, i, j)+M[i])$ (Expression XE) in which outside mask addition in the XEX mode as illustrated in FIG. 5 is omitted. Note that in the case of performing encryption by the two-round Feistel replacement, the XEX mode described above may be used as the TE function.

As described above, the Tweak-assigned encryption unit 102 can be configured to perform encryption by the XEX mode illustrated in FIG. 2 or encryption by the two-round Feistel replacement illustrated in FIG. 3. In the case of performing encryption by the XEX mode, the Tweak-assigned encryption unit 102 performs encryption for each block obtained by dividing the plaintext M (see FIG. 2). On the other hand, in the case of performing encryption by the two-round Feistel replacement, the Tweak-assigned encryption unit 102 performs encryption for a pair of blocks obtained by dividing the plaintext M (see FIGS. 3 and 4).

The partial checksum generation unit 103 gathers blocks of the plaintext M (M=M[1], M[2], . . . , M[m]) per a predetermined positive integer s, into one. Then, the partial checksum generation unit 103 calculates a plurality of partial checksums on the basis of the blocks gathered.

For example, the partial checksum generation unit 103 may be configured to calculate a partial checksum using exclusive-OR. In the case of calculating a partial checksum using exclusive-OR, the partial checksum generation unit 103 calculates the followings as respective partial checksums:

$$S[1]=M[1]+M[2]+ \ldots +M[s]$$

$$S[2]=M[s+1]+M[s+2] \ldots +M[2s] \ldots$$

Then, the partial checksum generation unit 103 outputs their sequence S=S[1], S[2], . . . , S[m/s].

For example, the example illustrated in FIG. 2 shows an example of processing performed by the partial checksum generation unit 103 when s=2. In the case illustrated in FIG. 2, the partial checksum generation unit 103 gathers blocks per s=2 pieces into one, and calculates a partial checksum S[1] by calculating exclusive-OR of M[1] and M[2] gathered into one. Further, the example illustrated in FIG. 3 shows an example of processing performed by the partial checksum generation unit 103 when s=4. In the case illustrated in FIG. 3, the partial checksum generation unit 103 gathers blocks per s=4 pieces into one, and calculates a partial checksum S[1] by calculating exclusive-OR of M[1], M[2], M[3], and M[4].

Note that when the number m of blocks of the plaintext is not a multiple of s, the partial checksum generation unit 103 performs appropriate padding on the plaintext and then calculates partial checksums. Through such processing, even in the case where the number m of blocks of the plaintext is not a multiple of s, it is possible to calculate partial checksums without any problems.

Note that the partial checksum generation unit 103 may be configured to calculate partial checksums by using, for example, any group such as arithmetic addition and ring operation, not limited to exclusive-OR.

Further, in the case where the Tweak-added encryption unit 102 performs encryption by the two-round Feistel replacement, the partial checksum generation unit 103 may use even-number blocks among M[1] to M[s], where s takes an even number.

That is, $S[i]=M[2i]+M[2i+2]+ \ldots +C[2i+s]$ is also possible.

The meta checksum generation unit 104 hashes the partial checksum sequence S, generated by the partial checksum generation unit 103, to one block using a keyed hash function or a pseudo-random function, and outputs a meta checksum MetaSum.

For example, the meta checksum generation unit 104 can use a keyed hash method similar to the Parallelizable Message Authentication Code (PMAC) of Non-Patent Literature 1. Specifically, the meta checksum generation unit 104 calculates $V[i]=TE(N, i, j')(S[i])$ for each i=1, . . . , m/s, with use of the TE function used by the Tweak-assigned encryption unit 102. Then, the meta checksum generation unit 104 calculates the meta checksum MetaSum by calculating exclusive-OR of the calculation result of each i. In other words, the meta checksum generation unit 104 obtains the meta checksum MetaSum by calculating $V[1]+V[2]++ \ldots +V[m/s]$.

Note that j' is any value different from j (for example, 1) used by the Tweak-assigned encryption unit 102, and j'=2, for example. Further, the meta checksum generation unit 104 may calculate V[i] for each i with use of the XE mode TE(N, i, j)=E(g(N, i, j)+M[i]) (Expression XE) in which mask addition on the outside of the TE is omitted. Also, the meta checksum generation unit 104 may be configured to use a general purpose keyed hash function disclosed in Non-Patent Literature 3 or the like or a pseudo-random function.

The meta checksum encryption unit 105 encrypts the meta checksum MetaSum obtained by the meta checksum generation unit 104 with use of the initial vector N, generated by the initial vector generation unit 101, as Tweak. Thereby, the meta checksum encryption unit 105 generates a tag T.

For example, the meta checksum encryption unit 105 performs encryption by T=TE(N, i, j") (MetaSum), with use of the TE function used by the Tweak-assigned encryption unit 102. Note that j" is any value that is different from j (for example, 1) used by the Tweak-assigned encryption unit 102 and from j' (for example, 2) used by the meta checksum generation unit 104. For example, j"=3.

The ciphertext output unit 106 outputs the initial vector N generated by the initial vector generation unit 101, the ciphertext C encrypted by the Tweak-assigned encryption unit 102, and the tag T generated by the meta checksum encryption unit 105. The ciphertext output unit 106 is realized by a character display unit such as a display, for example. The ciphertext output unit 106 may be configured to output the initial vector N, the ciphertext C, and the tag T to an external device connected via a network, for example.

An exemplary configuration of the encryption device 10 has been described. Next, an exemplary configuration of the decryption device 20 will be described.

The decryption device 20 decrypts the ciphertext with use of a common secret key shared with the encryption device 10 and detects presence or absence of tampering. Referring to FIG. 1, the decryption device 20 includes a ciphertext input unit 200, a Tweak-assigned decryption unit 201, a partial checksum generation unit 202, a meta checksum generation unit 203, a meta checksum encryption unit 204 (tag generation unit), a tag verification unit 205, and a decryption result output unit 206.

For example, the decryption device 20 includes an arithmetic unit such as a central processing unit (CPU) and a storage unit, not shown. The decryption device 20 implements the respective processing units through execution of a program, stored in the storage unit not shown, by the arithmetic unit, for example. Note that it can be said that processing accompanying decryption and verification performed by the respective processing units may be realized by a decoder included in the decryption device 20.

The ciphertext input unit 200 receives the ciphertext to be decrypted, the initial vector N, and the tag T. The ciphertext input unit 200 is realized by a character input unit such as a keyboard, for example. The ciphertext input unit 200 may be configured to receive input of the ciphertext C, the initial vector N, and the tag T from an external device connected via a network, for example.

The Tweak-assigned decryption unit 201 performs decryption corresponding to the Tweak-assigned encryption unit 102. The Tweak-assigned decryption unit 201 acquires m pieces of blocks C[1], C[2], . . . C[m] generated by dividing the ciphertext C per n-bit blocks. Then, the Tweak-assigned decryption unit 201 decrypts each block C[i] (i=1, 2, . . . , m) by common key cipher with use of the initial vector N and the index i of the block as an auxiliary variable called Tweak. Thereby, the Tweak-assigned decryption unit 201 obtains a plaintext M=(M[1], M[2], . . . , M[m]) having a length that is the same as the length of the block obtained by dividing the ciphertext C. Note that the Tweak may include an index j (for example, j=1) representing the type of processing.

For example, the Tweak-assigned decryption unit 201 performs decryption by the XEX mode, similar to the Tweak-assigned encryption unit 102. FIG. 6 illustrates an example of overall processing performed when the Tweak-assigned decryption unit 201 of the decryption device 20 performs decryption by the XEX mode. Referring to FIG. 6, when the Tweak-assigned decryption unit 201 performs decryption by the XEX mode, it decrypts the ciphertext C by calculating $$M[i]=TD(N,i,j)(C[i])$$

where $TD(N,i,j)=g(N,i,j)+D(g(N,i,j)+C[i])$

Here, D(*) is a decryption function of block cipher, and satisfies an inverse function of E in (Expression XEX), that is, D(E(M))=M.

As described above, the Tweak-assigned decryption unit 201 performs decryption on each block, on the basis of the TD function and the ciphertext C. For example, in the case of FIG. 6, the Tweak-assigned decryption unit 201 performs decryption based on the block C[1] of the ciphertext and the TD function TD(N, 1, 1), to thereby obtain the block M[1] of the plaintext.

Also, as illustrated in FIGS. 7 and 8, the Tweak-assigned decryption unit 201 can be configured to divide the ciphertext C per two n-bit blocks and then perform decryption by the two-round Feistel replacement disclosed in Patent Literature 2. As illustrated in FIG. 8, decryption by the two-round Feistel replacement is performed as follows on continuous two blocks C[i] and C[i+1] (where i represents an odd number) of the ciphertext:

$$M[i]=TE(N,(i+1)/2,j')(C[i])+C[i+1]$$

$$M[i+1]=TE(N,(i+1)/2,j)(M[i])+C[i]$$

In other words, the Tweak-assigned decryption unit 201 performs an inverse function of the (Expression 2RFesitel) described above. In the case of performing decryption by the two-round Feistel replacement, TD is not required for decryption, which is different from the case of using XEX.

In the case of performing decryption by the two-round Feistel replacement, XE mode (Expression XE) may be used as the TE function, similar to the case of the Tweak-assigned encryption unit 102.

As described above, the Tweak-assigned decryption unit 201 decrypts the ciphertext C by processing corresponding to the Tweak-assigned encryption unit 102.

The configurations of the partial checksum generation unit 202, the meta checksum generation unit 203, and the meta checksum encryption unit 204 are similar to the configurations of the partial checksum generation unit 103, the meta checksum generation unit 104, and the meta checksum encryption unit 105 of the encryption device 10. Therefore, detailed description thereof is omitted. However, a tag output by the meta checksum encryption unit 204 is different from the tag T output by the ciphertext input unit 200, and is one calculated locally. Hereinafter, a tag output by the meta checksum encryption unit 204 is expressed as a verification tag T'.

The tag verification unit 205 performs verification by comparison between the verification tag T' calculated locally and output by the meta checksum encryption unit 204, and the tag T output by the ciphertext input unit 200. Then, on the basis of the verification result, the tag verification unit 205 outputs a binary verification result of either "match" indicating that the verification tag T' and the tag T match or "unmatch" indicating that the verification tag T' and the tag T do not match.

The decryption result output unit 206 outputs the binary verification result output by the tag verification unit 205, and the plaintext M output by the Tweak-assigned decryption unit 201. The decryption result output unit 206 is realized by a character display unit such as a display, for example. The decryption result output unit 206 may be configured to output the plaintext M to an external device connected via a network, for example.

An exemplary configuration of the decryption device 20 has been described.

Next, with reference to FIGS. 9 to 12, description will be given on an exemplary flow of an encryption process performed by the encryption device 10 and an exemplary flow of a decryption process performed by the decryption device 20. First, with reference to FIGS. 9 and 10, an exemplary flow of an encryption process performed by the encryption device 10 will be described.

With reference to FIGS. 9 and 10, the plaintext input unit 100 receives the plaintext M=(M[1], M[2], . . . , M[m]) to be encrypted. As illustrated in FIG. 9, the plaintext M input to the plaintext input unit 100 is divided into a plurality of blocks, and the blocks are input to the Tweak-assigned encryption unit 102 and the partial checksum generation unit 103. Further, the initial vector generation unit 101 generates the initial vector N (step S101).

The Tweak-assigned encryption unit 102 uses the initial vector N as Tweak to encrypt the plaintext M per blocks, to thereby obtain the ciphertext C that is encrypted and has the same length as that of the block of the plaintext M (step S102).

The partial checksum generation unit 103 divides the plaintext M per the predetermined s blocks. Then, the partial checksum generation unit 103 calculates the partial checksums S[1], S[2], . . . , S[m/s] respectively and independently (step S103). Then, the meta checksum generation unit 104 applies keyed hash to the sequence S=(S[1], S[2], . . . , S[m/s]) of the partial checksums to generate a meta checksum MetaSum of one block (step S104). Then, the meta checksum encryption unit 105 encrypts the meta checksum MetaSum to thereby obtain the tag T (step S105).

The ciphertext output unit 106 outputs the initial vector N, the ciphertext C, and the tag T obtained from the respective processes (step S106).

An exemplary flow of the encryption process performed by the encryption device 10 has been described. Next, with reference to FIGS. 11 and 12, an exemplary flow of a decryption process performed by the decryption device 20 will be described.

Referring to FIGS. 11 and 12, the ciphertext input unit 200 receives the ciphertext C=(C[1], C[2], . . . , C[m]) to be decrypted, the initial vector N, and the tag T (step S201). As illustrated in FIG. 11, the ciphertext C, among them, is used by the Tweak-assigned decryption unit 201. The initial vector N is used by the Tweak-assigned decryption unit 201, the meta checksum generation unit 203, and the meta checksum encryption unit 204. The tag T is used by the tag verification unit 205.

The Tweak-assigned decryption unit 201 uses the initial vector N as Tweak to decrypt the ciphertext C by the block, to thereby obtain the plaintext M that is decrypted and has the same length as that of the block of the ciphertext C (step S202).

The partial checksum generation unit 202 divides the plaintext M per predetermined s blocks. Then, the partial checksum generation unit 202 calculates the partial checksums S[1], S[2], . . . , S[m/s] respectively and independently (step S203). Then, the meta checksum generation unit 203 applies keyed hash to the sequence S=(S[1], S[2], . . . , S[m/s]) of the partial checksums to generate a meta checksum MetaSum of one block (step S204). Then, the meta checksum encryption unit 204 encrypts the meta checksum MetaSum to thereby obtain the verification tag T' calculated locally (step S205).

The tag verification unit 205 compares the T output by the ciphertext input unit 200 with the verification tag T' output by the meta checksum encryption unit 204. Then, the tag verification unit 205 outputs a binary verification result representing match or unmatch (step S206).

The decryption result output unit 206 outputs the obtained binary verification result and the plaintext M (step S207).

An exemplary flow of the decryption process performed by the decryption device 20 has been described.

As described above, the encryption device 10 of the present embodiment includes the partial checksum generation unit 103, the meta checksum generation unit 104, and the meta checksum encryption unit 105. With this configuration, the meta checksum encryption unit 105 can generate the tag T by encrypting the meta checksum calculated by the meta checksum generation unit 104 on the basis of the partial checksums calculated by the partial checksum generation unit 103. That is, the encryption device 10 uses the meta checksum, obtained by applying keyed hash to all of the partial checksums, for deriving a tag. Thereby, an attack to the INT-RUP security will never succeed unless all of the linear restrictions defined in the "s" blocks (that is, partial checksums) are satisfied. As a result, by limiting "s" to be sufficiently small, it is possible to secure high INT-RUP security. Note that when "s" is 1, it means a message authentication code is applied to a plaintext substantially. Therefore, the configured authenticated encryption costs similarly to the general-purpose coupling. Therefore, from the viewpoint of cost, it is desirable that "s" is 2 or larger. On the other hand, when s=2, it is possible to achieve efficiency of almost 25% compared with the case of general-purpose coupling. Although it is possible to increase the efficiency by increasing the parameter "s", there is a tradeoff that quantitative INT-RUP security is lowered. Therefore, it is desirable to set an appropriate parameter "s" according to the application.

Summary of an attack to the INT-RUP security with respect to OCN, illustrated in Non-Patent Document 2, will be provided below.

In the attack described in Non-Patent Document 2, an attacker queries an arbitrary initial vector N and m blocks of a plaintext M=(M[1], M[2], . . . , M[m]) to encryption oracle. Then, the attacker acquires a ciphertext C=(C[1], C[2], . . . , C[m]) and a tag T from the encryption oracle. Then, the attacker queries unverified decryption oracle with use of two pairs of ciphertext and tags. That is, a query to unverified decryption oracle is executed with use of (N,C_1=(C_1[1], C_1[2], . . . , C_1[m]), T_1) and (N,C_2=(C_2[1], C_2[2], . . . , C_2[m]), T_2). Here, as each block of C_1 and each block of C_2, those different from the corresponding blocks of the ciphertext C are selected, and T_1 and T_2 are selected arbitrarily. It is assumed that return values from the unverified decryption oracle, that is, unverified plaintext blocks are (M_1[1], M_1[2], M_1[m]) and (M_2[1], M_2[2], . . . , M_2[m]), respectively. Here, from the initial query to the encryption oracle, TE(N, 6, 2)(M[1]+

M[2]++M[m])=T has been known. Also, a value of an unverified plaintext with respect to another ciphertext C' obtained by appropriately combining the C_1 block and the C_2 block (for example, when blocks of C_1 and C_2 are used alternately, C'=(C_1[1], C_2[2], . . . ) is obtained) and the checksum thereof have been known.

Under such conditions, Non-Patent Document 2 shows the fact that if m is almost the same as the block size n, there is a combination in which the checksum of the unverified plaintext matches a known checksum M[1]+M[2]++M[m] with the probability of almost ½, and when it exists, it can be always found efficiently. When such C' is found, (N, C', T) always succeeds as forgery.

The attack described above repeatedly uses the same initial vector on the decryption side, and functions by finding an unverified plaintext that satisfies a particular linear constraint, that is, a constraint that the checksum is the same as that of the plaintext first used in the encryption query. On that other hand, in the present invention, a meta checksum obtained by applying keyed hash to all partial checksums is used for deriving a tag, as described above. Therefore, since the attack described above does not succeed unless all of the linear constraints (that is, partial checksums) defined in the s blocks are satisfied, it is possible to secure high INT-RUP security consequently by limiting the parameter s to be sufficiently small.

Second Exemplary Embodiment

Figure 13:
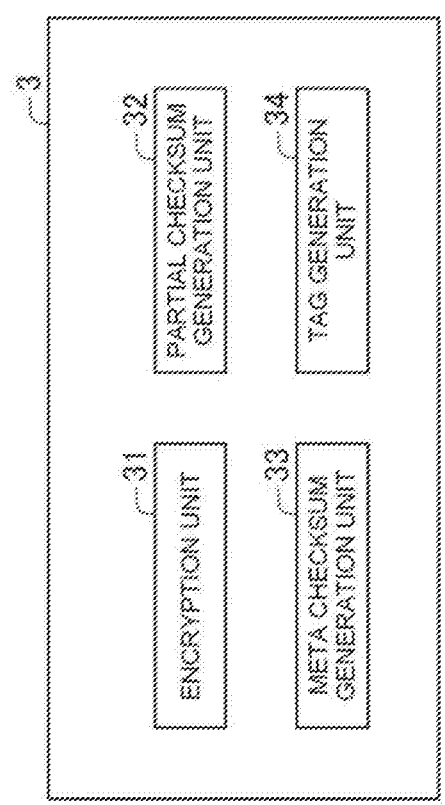
FIG. 13 is a block diagram illustrating an exemplary configuration of an encryption device according to a second exemplary embodiment of the present invention.

Next, a second exemplary embodiment of the present invention will be described with reference to FIGS. 13 and 14. In the second exemplary embodiment, outlines of configurations of an encryption device 3 and a decryption device 4 will be described.

First, a configuration of the encryption device 3 will be described with reference to FIG. 13. FIG. 13 illustrates an exemplary configuration of the encryption device 3. Referring to FIG. 13, the encryption device 3 of the present embodiment includes an encryption unit 31, a partial checksum generation unit 32, a meta checksum generation unit 33, and a tag generation unit 34.

For example, the encryption device 3 includes an arithmetic unit such as a CPU and a storage unit that are not shown. The encryption device 3 implements the respective processing units through execution of a program, stored in the storage unit not shown, by the arithmetic unit, for example. Note that processing accompanying encryption performed by the respective processing units may be realized by an encoder included in the encryption device 3.

The encryption unit 31 encrypts blocks obtained by dividing a plaintext, with use of an auxiliary variable.

The partial checksum generation unit 32 generates a plurality of partial checksums on the basis of the respective blocks obtained by dividing the plaintext. Further, the meta checksum generation unit 33 generates a meta checksum on the basis of the partial checksums generated by the partial checksum generation unit 32. Then, the tag generation unit 34 generates a tag to be used for detecting tampering, on the basis of the meta checksum generated by the meta checksum generation unit 33.

The encryption device 3 generates a ciphertext by encrypting the plaintext as described above, and also generates a tag. Then, the encryption device 3 outputs the ciphertext encrypted by the encryption device 31 and the tag generated by the tag generation unit 34.

As described above, the encryption device 3 includes the partial checksum generation unit 32, the meta checksum generation unit 33, and the tag generation unit 34. With this configuration, the tag generation unit 34 can generate a tag T by encrypting the meta checksum calculated by the meta checksum generation unit 33 on the basis of the partial checksums calculated by the partial checksum generation unit 32. Thereby, high INT-RUP security can be secured.

Further, the encryption device 3 described above can be realized by incorporating a predetermined program in the encryption device 3. Specifically, a program that is another embodiment of the present invention is a program that causes the encryption device 3 to realize the encryption unit 31 that encrypts blocks, obtained by dividing a plaintext, with use of an auxiliary variable, the partial checksum generation unit 32 that generates a plurality of partial checksums on the basis of the blocks obtained by dividing the plaintext, the meta checksum generation unit 33 that generates a meta checksum on the basis of the partial checksums generated by the partial checksum generation unit 32, and the tag generation unit 34 that generates a tag to be used for detecting tampering, on the basis of the meta checksum generated by the meta checksum generation unit 33, and output a ciphertext encrypted by the encryption unit 31 and the tag generated by the tag generation unit 34.

Further, the encryption method performed by the encryption device 3 described above is an encryption method including, by the encryption method 3, encrypting blocks, obtained by dividing a plaintext, with use of an auxiliary variable, generating a plurality of partial checksums on the basis of the blocks obtained by dividing the plaintext, generating a meta checksum on the basis of the partial checksums generated, generating a tag to be used for detecting tampering, on the basis of the meta checksum generated, and outputting a ciphertext and the tag.

The invention of the program or the encryption method having the configuration described above has the same action as that of the encryption device 4. Therefore, an object of the present invention described above can be achieved.

Next, a configuration of the decryption device 4 will be described with reference to FIG. 14. FIG. 14 illustrates an exemplary configuration of the decryption device 4. Referring to FIG. 14, the decryption device 4 includes a decryption unit 41, a partial checksum generation unit 42, a meta checksum generation unit 43, a tag generation unit 44, and a tag verification unit 45.

For example, the decryption device 4 includes an arithmetic unit such as a CPU and a storage unit that are not shown. The decryption device 4 implements the respective processing units through execution of a program, stored in the storage unit not shown, by the arithmetic unit, for example. Note that it can be said that processing accompanying decryption and verification performed by the respective processing units may be realized by a decoder included in the decryption device 4.

The decryption unit 41 decrypts the blocks, obtained by dividing a ciphertext, for each block with use of an auxiliary variable to generate a plaintext.

The partial checksum generation unit 42 generates a plurality of partial checksums on the basis of the blocks of the plaintext decrypted by the decryption unit 41. Further, the meta checksum generation unit 43 generates a meta checksum on the basis of the partial checksums generated by the partial checksum generation unit 42, and the tag generation unit 44 generates a verification tag to be used for detecting tampering on the basis of the meta checksum generated by the meta checksum generation unit 43. Thereafter, the tag verification unit 45 performs verification by comparison between the tag received along with the ciphertext and the verification tag generated by the tag generation unit 44.

The decryption device 4 decrypts the ciphertext to generate a plaintext, and also performs verification between the tag and the verification tag, as described above. Then, the decryption device 4 outputs the plaintext decrypted by the decryption device 1 and a result of verification by comparison performed by the tag verification unit 45.

As described above, the decryption device 4 includes the partial checksum generation unit 42, the meta checksum generation unit 43, the tag generation unit 44, and the tag verification unit 45. Even with this configuration, an object of the present invention can be achieved, similar to the case of the encryption device 3.

Further, the decryption device 4 described above can be realized by incorporating a predetermined program in the decryption device 3. Specifically, a program that is another embodiment of the present invention is a program that causes the decryption device 4 to realize, the decryption unit 41 that decrypts each of blocks, obtained by dividing a ciphertext, with use of an auxiliary variable and generates a plaintext, the partial checksum generation unit 42 that generates a plurality of partial checksums on the basis of the blocks of the plaintext decrypted by the decryption unit 41, the meta checksum generation unit 43 that generates a meta checksum on the basis of the partial checksums generated by the partial checksum generation unit 42, the tag generation unit 44 that generates a verification tag to be used for detecting tampering, on the basis of the meta checksum generated by the meta checksum generation unit 43, and a tag verification unit 45 that performs verification by comparison between a tag received along with the ciphertext and the verification tag generated by the tag generation unit, and output the plaintext decrypted by the decryption unit 41, and a result of verification by the comparison by the tag verification unit 45.

Further, the decryption method performed by the decryption device 4 is a method including, by the decryption unit 4, decrypting each of blocks, obtained by dividing a ciphertext, with use of an auxiliary variable and generating a plaintext, generating a plurality of partial checksums on the basis of the blocks of the plaintext decrypted, generating a meta checksum on the basis of the partial checksums generated, generating a verification tag to be used for detecting tampering, on the basis of the meta checksum generated, performing verification by comparison between a tag received along with the ciphertext and the verification tag generated, and outputting the decrypted plaintext and a result of verification by the comparison.

The invention of the program or the decryption method having the configuration described above has the same action as that of the encryption device 4. Therefore, an object of the present invention described above can be achieved.

SUPPLEMENTARY NOTES

The whole or part of the exemplary embodiments disclosed above can be described as, but not limited to, the following supplementary notes. Hereinafter, the outline of an encryption device and the like of the present invention will be described. However, the present invention is not limited to the configurations described below.

Supplementary Note 1

An encryption device comprising:
an encryption unit that encrypts blocks, obtained by dividing a plaintext, with use of an auxiliary variable;
a partial checksum generation unit that generates a plurality of partial checksums on a basis of the blocks obtained by dividing the plaintext;
a meta checksum generation unit that generates a meta checksum on a basis of the partial checksums generated by the partial checksum generation unit; and
a tag generation unit that generates a tag to be used for detecting tampering, on a basis of the meta checksum generated by the meta checksum generation unit, wherein
the encryption device outputs a ciphertext encrypted by the encryption unit and the tag generated by the tag generation unit.

Supplementary Note 2

The encryption device according to supplementary note 1, wherein the partial checksum generation unit gathers a predetermined number of the blocks, obtained by dividing the plaintext, into one, and generates each of the partial checksums for the blocks gathered into one to thereby generate the plurality of the partial checksums.

Supplementary Note 3

The encryption device according to supplementary note 2, wherein the partial checksum generation unit calculates exclusive-OR of the blocks gathered into one to thereby generate each of the partial checksums.

Supplementary Note 4

The encryption device according to any of supplementary notes 1 to 3, wherein the partial checksum generation unit gathers a predetermined number of even-numbered blocks of the blocks, obtained by dividing the plaintext, into one, and generates each of the partial checksums for the blocks gathered into one.

Supplementary Note 5

The encryption device according to any of supplementary notes 2 to 4, wherein the predetermined number is a value of 2 or larger.

Supplementary Note 6

The encryption device according to any of supplementary notes 1 to 5, wherein the meta checksum generation unit hashes the partial checksums, generated by the partial checksum generation unit, into one block with use of a keyed hash function or a pseudo-random function, to thereby generate the meta checksum.

Supplementary Note 7

The encryption device according to any of supplementary notes 1 to 6, wherein the tag generation unit encrypts the meta checksum generated by the meta checksum generation unit with use of an auxiliary variable, to thereby generate the tag.

Supplementary Note 8

The encryption device according to supplementary note 7, wherein the auxiliary variable used for generating the tag by the tag generation unit includes a value that is different from the auxiliary variable used for encrypting the plaintext by the encryption unit.

Supplementary Note 9

An encryption method comprising, by an encryption device:
encrypting blocks, obtained by dividing a plaintext, with use of an auxiliary variable;
generating a plurality of partial checksums on a basis of the blocks obtained by dividing the plaintext;
generating a meta checksum on a basis of the partial checksums generated;
generating a tag to be used for detecting tampering, on a basis of the meta checksum generated; and
outputting a ciphertext obtained by encrypting the plaintext, and the tag.

Supplementary Note 10

A program causing an encryption device to realize:
an encryption unit that encrypts blocks, obtained by dividing a plaintext, with use of an auxiliary variable;
a partial checksum generation unit that generates a plurality of partial checksums on a basis of the blocks obtained by dividing the plaintext;
a meta checksum generation unit that generates a meta checksum on a basis of the partial checksums generated by the partial checksum generation unit; and
a tag generation unit that generates a tag to be used for detecting tampering, on a basis of the meta checksum generated by the meta checksum generation unit, and
to output a ciphertext encrypted by the encryption unit and the tag generated by the tag generation unit.

Supplementary Note 11

A decryption device comprising:
a decryption unit that decrypts each of blocks, obtained by dividing a ciphertext, with use of an auxiliary variable and generates a plaintext;
a partial checksum generation unit that generates a plurality of partial checksums on a basis of the blocks of the plaintext decrypted by the decryption unit;
a meta checksum generation unit that generates a meta checksum on a basis of the partial checksums generated by the partial checksum generation unit;
a tag generation unit that generates a verification tag to be used for detecting tampering, on a basis of the meta checksum generated by the meta checksum generation unit; and
a tag verification unit that performs verification by comparison between a tag received along with the ciphertext and the verification tag generated by the tag generation unit, wherein
the decryption device outputs the plaintext decrypted by the decryption unit, and a result of verification by the comparison by the tag verification unit.

Supplementary Note 12

A decryption method comprising, by a decryption device:
decrypting each of blocks, obtained by dividing a ciphertext, with use of an auxiliary variable and generating a plaintext;
generating a plurality of partial checksums on a basis of the blocks of the plaintext decrypted;
generating a meta checksum on a basis of the partial checksums generated;
generating a verification tag to be used for detecting tampering, on a basis of the meta checksum generated;
performing verification by comparison between a tag received along with the ciphertext and the verification tag generated; and
outputting the decrypted plaintext and a result of verification by the comparison.

Supplementary Note 13

A program for causing a decryption device to realize:
a decryption unit that decrypts each of blocks, obtained by dividing a ciphertext, with use of an auxiliary variable and generates a plaintext;
a partial checksum generation unit that generates a plurality of partial checksums on a basis of the blocks of the plaintext decrypted by the decryption unit;
a meta checksum generation unit that generates a meta checksum on a basis of the partial checksums generated by the partial checksum generation unit;
a tag generation unit that generates a verification tag to be used for detecting tampering, on a basis of the meta checksum generated by the meta checksum generation unit; and
a tag verification unit that performs verification by comparison between a tag received along with the ciphertext and the verification tag generated by the tag generation unit, and
to output the plaintext decrypted by the decryption unit, and a result of verification by the comparison by the tag verification unit.

It should be noted that the program described in the respective exemplary embodiments and the supplementary notes may be stored in a storage device or stored on a computer-readable storage medium. The storage medium is a portable medium such as a flexible disk, an optical disk, a magneto-optical disk, or a semiconductor memory, for example.

While the present invention has been described with reference to the respective exemplary embodiments described above, the present invention is not limited to the above-described embodiments. The form and details of the present invention can be changed within the scope of the present invention in various manners that can be understood by those skilled in the art.

REFERENCE SIGNS LIST 10 encryption device
100 plaintext input unit
101 initial vector generation unit
102 Tweak-assigned encryption unit
103 partial checksum generation unit
104 meta checksum generation unit
105 meta checksum encryption unit
106 ciphertext output unit
20 decryption device
200 ciphertext input unit
201 Tweak-assigned decryption unit
202 partial checksum generation unit
203 meta checksum generation unit
204 meta checksum encryption unit
205 tag verification unit
206 decryption result output unit
3 encryption device
31 encryption unit
32 partial checksum generation unit 33 meta checksum generation unit
34 tag generation unit
4 decryption device
41 decryption unit
42 partial checksum generation unit
43 meta checksum generation unit
44 tag generation unit
45 tag verification unit

The invention claimed is:

1. An encryption device comprising:
   an encryption unit that encrypts blocks, obtained by dividing a plaintext, with use of an auxiliary variable;
   a partial checksum generation unit that generates a plurality of partial checksums on a basis of the blocks obtained by dividing the plaintext;
   a meta checksum generation unit that generates a meta checksum on a basis of the partial checksums generated by the partial checksum generation unit; and
   a tag generation unit that generates a tag to be used for detecting tampering, on a basis of the meta checksum generated by the meta checksum generation unit, wherein
   the encryption device outputs a ciphertext encrypted by the encryption unit and the tag generated by the tag generation unit.

2. The encryption device according to claim 1, wherein the partial checksum generation unit gathers a predetermined number of the blocks, obtained by dividing the plaintext, into one, and generates each of the partial checksums for the blocks gathered into one to thereby generate the plurality of the partial checksums.

3. The encryption device according to claim 2, wherein the partial checksum generation unit calculates exclusive-OR of the blocks gathered into one to thereby generate each of the partial checksums.

4. The encryption device according to claim 1, wherein the partial checksum generation unit gathers a predetermined number of even-numbered blocks of the blocks, obtained by dividing the plaintext, into one, and generates each of the partial checksums for the blocks gathered into one.

5. The encryption device according to claim 2, wherein the predetermined number is a value of 2 or larger.

6. The encryption device according to claim 1, wherein the meta checksum generation unit hashes the partial checksums, generated by the partial checksum generation unit, into one block with use of a keyed hash function or a pseudo-random function, to thereby generate the meta checksum.

7. The encryption device according to claim 1, wherein the tag generation unit encrypts the meta checksum generated by the meta checksum generation unit with use of an auxiliary variable, to thereby generate the tag.

8. The encryption device according to claim 7, wherein the auxiliary variable used for generating the tag by the tag generation unit includes a value that is different from the auxiliary variable used for encrypting the plaintext by the encryption unit.

9. An encryption method comprising, by an encryption device:
   encrypting blocks, obtained by dividing a plaintext, with use of an auxiliary variable;
   generating a plurality of partial checksums on a basis of the blocks obtained by dividing the plaintext;
   generating a meta checksum on a basis of the partial checksums generated;
   generating a tag to be used for detecting tampering, on a basis of the meta checksum generated; and
   outputting a ciphertext obtained by encrypting the plaintext, and the tag.

10. A decryption device comprising:
    a decryption unit that decrypts each of blocks, obtained by dividing a ciphertext, with use of an auxiliary variable and generates a plaintext;
    a partial checksum generation unit that generates a plurality of partial checksums on a basis of the blocks of the plaintext decrypted by the decryption unit;
    a meta checksum generation unit that generates a meta checksum on a basis of the partial checksums generated by the partial checksum generation unit;
    a tag generation unit that generates a verification tag to be used for detecting tampering, on a basis of the meta checksum generated by the meta checksum generation unit; and
    a tag verification unit that performs verification by comparison between a tag received along with the ciphertext and the verification tag generated by the tag generation unit, wherein
    the decryption device outputs the plaintext decrypted by the decryption unit, and a result of verification by the comparison by the tag verification unit.

* * * * *